US007818665B1

(12) United States Patent
Russin et al.

(10) Patent No.: US 7,818,665 B1
(45) Date of Patent: Oct. 19, 2010

(54) METHOD AND SYSTEM FOR SCHEMA VERSION TRANSFORM VERIFICATION

(75) Inventors: Robert M. Russin, Austin, TX (US); Larry D. Barto, Austin, TX (US); David A. Richardson, Austin, TX (US); Donald Craig Likes, Austin, TX (US); Russell C. Brown, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1151 days.

(21) Appl. No.: 11/472,732

(22) Filed: Jun. 22, 2006

(51) Int. Cl.
*G06F 17/28* (2006.01)
(52) U.S. Cl. ............... 715/236; 715/239; 717/124
(58) Field of Classification Search ............ 715/236, 715/239; 717/124
See application file for complete search history.

(56) References Cited

U.S. PATENT DOCUMENTS

| 6,167,409 | A | * | 12/2000 | DeRose et al. ............. 715/234 |
| 6,715,129 | B1 | * | 3/2004 | Hind et al. ............... 715/239 |
| 7,590,647 | B2 | * | 9/2009 | Srinivasan et al. ............. 1/1 |
| 2004/0205717 | A1 | * | 10/2004 | Chiang et al. ............. 717/124 |
| 2006/0047617 | A1 | * | 3/2006 | Bacioiu et al. ............. 706/59 |
| 2006/0101058 | A1 | * | 5/2006 | Chidlovskii ............. 707/102 |
| 2006/0288268 | A1 | * | 12/2006 | Srinivasan et al. ......... 715/505 |
| 2007/0050373 | A1 | * | 3/2007 | Ahmed et al. ............. 707/10 |
| 2009/0055421 | A1 | * | 2/2009 | Lier ..................... 707/101 |

OTHER PUBLICATIONS

"DM74AS282 Look-Ahead Carry Generator with Selectable Carry Inputs"; Dec. 1989; National Semiconductor Corporation.
Bray, Tim et al. (Editors); "Extensible Markup Language (XML) 1.1"; W3C Recommendation; Feb. 4, 2004; pp. 1-63; <http://www.w3.org/TR/2004/REC-xml11-20040204/>.
Clark, James (Editor); "XSL Transformations (XSLT)"; Version 1.0; W3C Recommendation; Nov. 16, 1999; pp. 1-102; <http://www.w3.org/TR/1999/REC-xslt-19991116>.

* cited by examiner

*Primary Examiner*—Cesar B Paula

(57) ABSTRACT

A method includes transforming, based on a first transform, a first markup language document associated with a first version of a schema to generate a second markup language document associated with a second version of the schema. The second markup language document is representative of a third markup language document associated with the second version of the schema and the first transform represents a transform from the first version of the schema to the second version of the schema. The method further includes comparing the second markup language document to the third markup language document to identify whether at least one discrepancy exists between the second markup language document and the third markup language document. The method additionally includes determining a suitability of the first transform based on the comparison of the second markup language document to the third markup language document.

20 Claims, 4 Drawing Sheets

METHOD AND SYSTEM FOR SCHEMA VERSION TRANSFORM VERIFICATION

STATEMENT REGARDING FEDERALLY SPONSORED RESEARCH OR DEVELOPMENT

The United States Government has a paid-up license in this invention and the right in limited circumstances to require the patent owner to license others on reasonable terms as provided for by the terms of Cooperative Agreement No. 70NANB1H3047 awarded by the United States Department of Commerce, National Institute of Standards and Technology ("NIST"), Advanced Technology Program ("ATP").

FIELD OF THE DISCLOSURE

The present disclosure relates generally to markup languages and more particularly to comparing documents according to different schemas.

BACKGROUND

Markup language documents frequently are used to control or define the operation of a system or other process. Typically, these markup language documents conform to a defined schema. However, it may be necessary to occasionally revise the schema due to any of a variety of factors. Revisions to a schema can result in the transformation of elements, the addition of new elements or attributes, or the deletion of elements or attributes, changes to available values for attributes, and the like. Markup language documents that conform to a prior version of a schema therefore may not adequately conform to a new version of the schema. Accordingly, transforms, such as stylesheets, often are developed to guide the conversion of a markup language document from one version of a schema to another version of the schema. These transform stylesheets typically are custom made by human operators. Due to the extensive nature of many of markup language documents and their transform stylesheets, a human operator often must verify that the transform stylesheet accurately transforms a markup language document from one schema version to the other schema version. This verification typically is performed by hand and therefore is time consuming. Further, different processes may be configured to operate based on different schema versions. Thus, different schema versions of a markup language document may need to be created for different processes. However, it often is impracticable to store different copies of a markup language document. Conventional processes therefore frequently implement two transforms, one to upgrade from a first version to a second version and one to downgrade from the second version to the first version. In both instances, a human operator typically is required to review both the upgrade transform and the downgrade transform of a markup language document, thereby incurring significant effort and time in the review process. Accordingly, an improved technique for verifying the suitability of schema version transforms for markup language documents therefore would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

Figure 1:
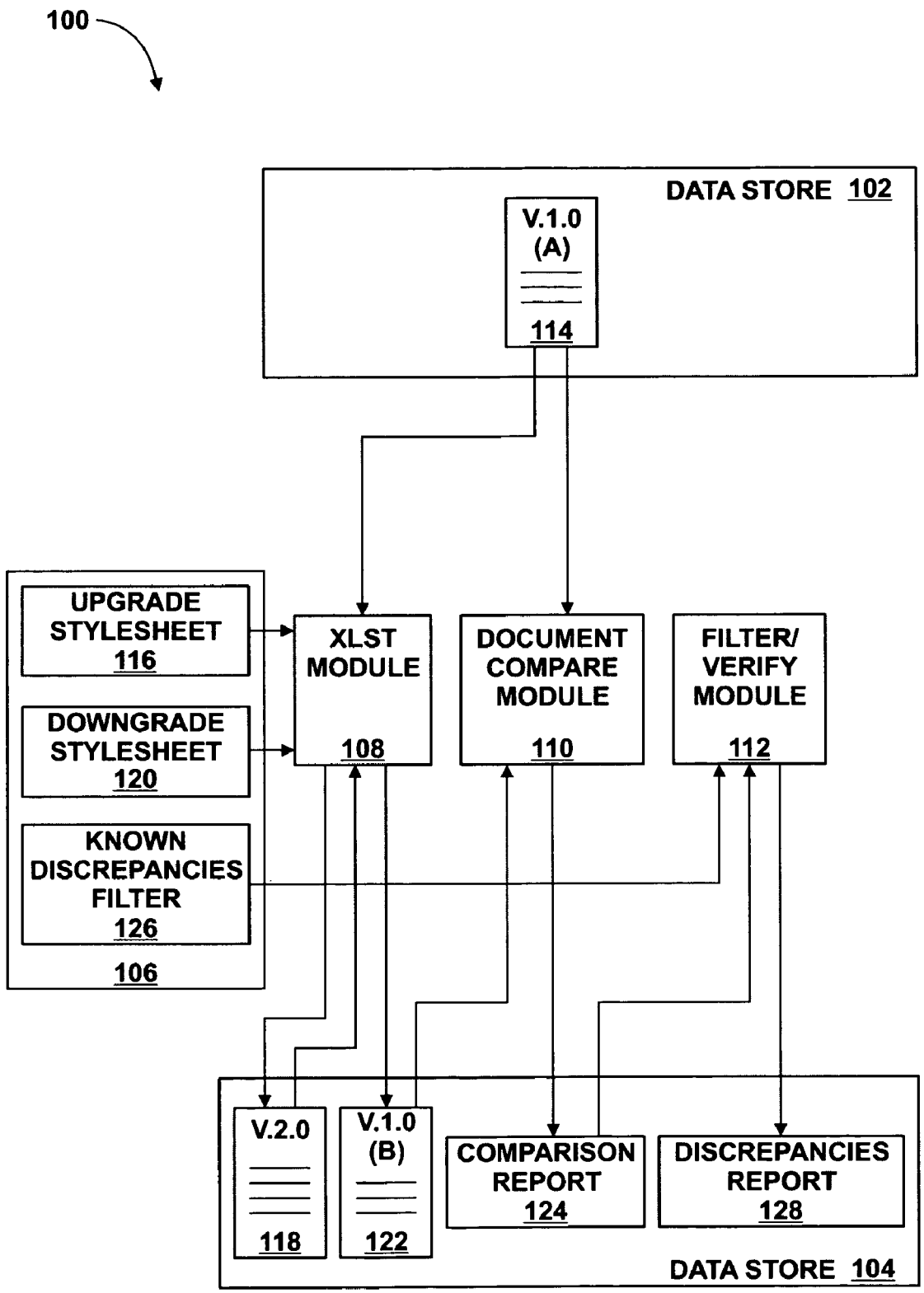
FIG. 1 is a block diagram illustrating an exemplary document repository utilizing schema version transform verification in accordance with at least one embodiment of the present disclosure.

The following description is intended to convey a thorough understanding of the present disclosure by providing a number of specific embodiments and details involving conversion of markup language documents between schema versions. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

In accordance with one aspect of the present disclosure, a method includes transforming, based on a first transform, a first markup language document associated with a first version of a schema to generate a second markup language document associated with a second version of the schema. The second markup language document is representative of a third markup language document associated with the second version of the schema and the first transform represents a transform from the first version of the schema to the second version of the schema. The method further includes comparing the second markup language document to the third markup language document to identify whether at least one discrepancy exists between the second markup language document and the third markup language document. The method additionally includes determining a suitability of the first transform based on the comparison of the second markup language document to the third markup language document.

In accordance with another embodiment of the present disclosure, a system includes a data store to store a first markup language document associated with a first version of a schema and a transform module operably coupled to the data store. The transform module is to generate a second markup language document associated with a second version of the schema based on the first markup language document and a first transform, and generate a third markup language document associated with the first version of the schema based on the second markup language document and a second transform. The first transform represents a transform from the first version of the schema to the second version of the schema and the second transform represents a transform from the second version of the schema to the first version of the schema. The system further includes a compare module operably coupled to the transform module. The compare module is to generate a comparison report based on a comparison of the third markup language document to the first markup language document. The comparison report represents discrepancies between the first markup language document and the third markup language document identified from the comparison of the third markup language document with the first markup language document. The system further includes a verify module operably coupled to the transform module and the compare module. The verify module is to filter out previously identified discrepancies from the comparison report to generate a discrepancies report.

In accordance with yet another aspect of the present disclosure, a computer readable medium embodies a set of instructions executable by a processing device. The set of executable instructions includes instructions to transform, based on a first transform, a first markup language document associated with a first version of a schema to generate a second markup language document associated with a second version of the schema. The second markup language document is representative of a third markup language document associated with the second version of the schema and the first transform represents a transform from the first version of the schema to the second version of the schema. The set of executable instructions further includes instructions to compare the second markup language document to the third markup language document to identify whether at least one discrepancy exists between the second markup language document and the third markup language document. The set of executable instructions also includes instructions to determine a suitability of the first transform based on the comparison of the second markup language document with the third markup language document.

FIGS. 1-4 illustrate exemplary techniques for verifying the suitability of schema version transforms used to transform markup language documents. In accordance with one embodiment, an upgrade transform is applied to an original document to generate an upgraded document, where the upgrade transform represents the transform between a first schema version and a second schema version. A downgrade transform then is applied to the upgraded document to generate a downgraded document, where the downgrade transform represents the transform between the second schema version and the first schema version. In the event that the upgrade transform and the downgrade transform both are accurate, the downgraded document is expected to be substantially consistent with the original document. Accordingly, the downgraded document and the original document are compared and a set of discrepancies, if any, between the downgraded document and the original document is generated based on the comparison. Known discrepancies associated with the upgrade/downgrade transforms are filtered from the set of discrepancies. In the event that discrepancies remain after the filter is applied, the downgraded document is identified as inconsistent with the original document and the upgrade/downgrade transforms therefore are identified as unsuitable for use in transforming markup language documents between schema versions. If identified as unsuitable, the upgrade/downgrade transforms can be refined to address the discrepancies remaining in the filtered set of discrepancies. In the event that no discrepancies remain after filtering, the downgraded document is identified as consistent with the original document and the upgrade/downgrade transforms therefore are identified as suitable for use. Further, in one embodiment, the upgraded document also is approved for use as a replacement or alternate of the original document when the upgrade transform and downgrade transform are identified as suitable for use (e.g., when the downgraded document is determined to be sufficiently consistent with the original document). Likewise, the upgrade/downgrade/compare process described herein can be used to identify improperly formatted documents.

For ease of discussion, the exemplary techniques of the present disclosure are described herein in the context of extensible markup language (XML) format. Other markup language formats can be implemented using the guidelines provided herein without departing from the scope of the present disclosure. Examples of other suitable markup languages can include, but are not limited to, standard general markup language (SGML), hypertext markup language (HTML), extensible hypertext markup language (XHTML), and vector markup language (VML). Further, the upgrade/downgrade transforms are described herein in the context of extensible stylesheet language transformation (XLST) stylesheets. However, other representations of the transforms may be utilized as appropriate without departing from the scope of the present disclosure.

Referring to FIG. 1, an exemplary document repository 100 implementing schema version transform verification is illustrated in accordance with at least one embodiment of the present disclosure. The document repository 100 includes a document data store 102, a document data store 104 and a process data store 106. The data stores 102, 104 and 106 can be implemented as a single data store or as separate data stores. A data store can include volatile storage (e.g., RAM) or non-volatile storage (e.g., a hard disc or flash memory) and can be formatted as a database, a file system, a data structure and the like. The document repository 100 further includes an XLST module 108, a document compare module 110, and a filter/verify module 112. The modules 108, 110 and 112 can be implemented as hardware, software, firmware, or combinations thereof. To illustrate, in one embodiment, the modules 108, 110 and 112 are implemented as software including executable instructions that manipulate one or more processors to perform the functions described herein. For example, an implementation of the XLST module 108 and the filter/verify module 112 includes, for example, the Xalen XLST transform engine (formerly Lotus XML). As another example, the document comparison module 110 can be implemented as a Java engine.

The XLST module 108, in one embodiment, accesses an original XML document 114 based on a first version of a schema (e.g., version 1.0) from the data store 102 and applies an upgrade stylesheet 116 from the process data store 106 to generate an upgraded XML document 118 that is expected to be consistent with a second version of the schema (e.g., version 2.0), which is then stored in the data store 104. The upgrade stylesheet 116 represents the upgrade transform between the first version and the second version of the schema (e.g., between version 1.0 and version 2.0). The XLST module 108 also applies a downgrade stylesheet 120 from the process data store 106 to the upgraded XML document 118 to generate a downgraded XML document 122 that is expected to be consistent with the first version of the schema. The downgraded XML document 122 also is stored in the data store 104.

The document compare module 110, in one embodiment, compares the original XML document 114 with the downgraded XML document 122. In one embodiment, elements in the XML document are represented as a tree of objects starting with a root object. The document compare module 110 recursively compares each object from one document to the corresponding object from another starting at the root until the leaves of tree are reached. The document compare module 110 then provides a comparison report 124 based on the results of the comparison. In the event that the document compare module 110 identifies discrepancies between the original XML document 114 and the downgraded XML document 122, the comparison report 124 includes a representation of the identified discrepancies in the form of, for example, a set or other listing of the discrepancies.

In certain instances, a user may have previously identified discrepancies expected to result from the application of the combination of the upgrade stylesheet 116 and the downgrade stylesheet 120. These known discrepancies may be identified based on an analysis of the differences between the first schema version and the second schema version or based on an analysis of the upgrade stylesheet 116 and the downgrade stylesheet 120. For example, the first schema version may include an element that is not present in the second schema version, or vice versa. Further, the first schema version may include an attribute for an element that is not present in the second schema version, or vice versa. As another example, the values that can be selected for a particular attribute for the first schema version may not be consistent with the values that can be selected for the attribute for the second schema version. Discrepancies also can be empirically identified based on prior testing or use of the upgrade stylesheet 116 and/or the downgrade stylesheet 120 on other XML documents.

The known discrepancies, if any, are used to generate a discrepancies filter 126, which can be stored in the process data store 106. The filter/verify module 112, in one embodiment, accesses the discrepancies filter 126 and applies it to the comparison report 124 to remove any known discrepancies that may be present in the comparison report 124. Any discrepancies remaining after filtering are input to a discrepancies report 128. In one embodiment, the comparison report 124 is an XML document and the discrepancies filter 126 is an XLST stylesheet. In this instance, the filter/verify module 112 filters the comparison report 124 to generate the discrepancies report 128 by applying the XLST transform represented by the discrepancies filter 126 to the comparison report 124.

In the event that the discrepancies report 128 does not list any discrepancies (e.g., all of the discrepancies in the comparison report 124 were known discrepancies), the filter/verify module 112 can mark or otherwise identify the upgrade stylesheet 116 and the downgrade stylesheet 120 as verified and suitable for use in upgrading or downgrading XML documents of the document repository 100 between the first schema version and the second schema version. Otherwise, if one or more discrepancies remain after filtering, filter/verify module 112 marks the upgrade stylesheet 116 and the downgrade stylesheet 120 as unsuitable for use and a user is notified of the verification failure along with details of any identified discrepancies. If the user determines that the remaining discrepancies are of relative inconsequence with respect to the proper operation of the stylesheets 116 and 120 (e.g., the discrepancies are expected due to differences between the schema versions), the user can override the verification process and mark the stylesheets 116 and 120 as verified. Further, the discrepancies filter 126 can be modified to include the remaining discrepancies as known discrepancies for filtering for the next application of the discrepancies filter 126. If, however, some or all of the remaining discrepancies represent a material error in at least one of the stylesheets 116 and 120 that would have deleterious effect on the operation of a process utilizing an XML document transformed using one of the stylesheets 116 or 120, the user can further refine the stylesheets 116 and 120 to correct for the source of these discrepancies.

It will be appreciated that a schema may have more than two versions. Accordingly, the document repository 100 may implement upgrade transforms and downgrade transforms across multiple schema versions. In one embodiment, a multiple-version transform can be implemented using a single stylesheet. To illustrate, an upgrade stylesheet can be used to transform an XML document consistent with version 1.0 directly to an XML document consistent with version 3.0. Likewise, a downgrade stylesheet can be used to transform an XML document consistent with version 3.0 directly to an XML document consistent with version 1.0. In this instance, the multiple-version upgrade/downgrade stylesheets can be verified as discussed above. In an alternate embodiment, multiple stylesheets are used to transform an XML document from one version to another in a stepwise fashion. To illustrate, a first upgrade stylesheet can be used to upgrade the XML document from version 1.0 to version 2.0 and a second upgrade stylesheet can be used to further upgrade the XML document from version 2.0 to version 3.0. The downgrade transform of XML documents also can be performed in a stepwise fashion. In certain instances, it may be sufficient to verify each transform step individually to verify a multiple-step transform. However, in certain instances, stepwise transforms may not be transitive. Accordingly, in these instances, the entire sequence of upgrade transforms and downgrade transforms may be verified. To illustrate, the transforms from version 1.0 to 2.0 and from version 2.0 to 3.0 each can be individually verified so as to verify a multi-step transform from version 1.0 to 2.0 to 3.0.

Figure 2:
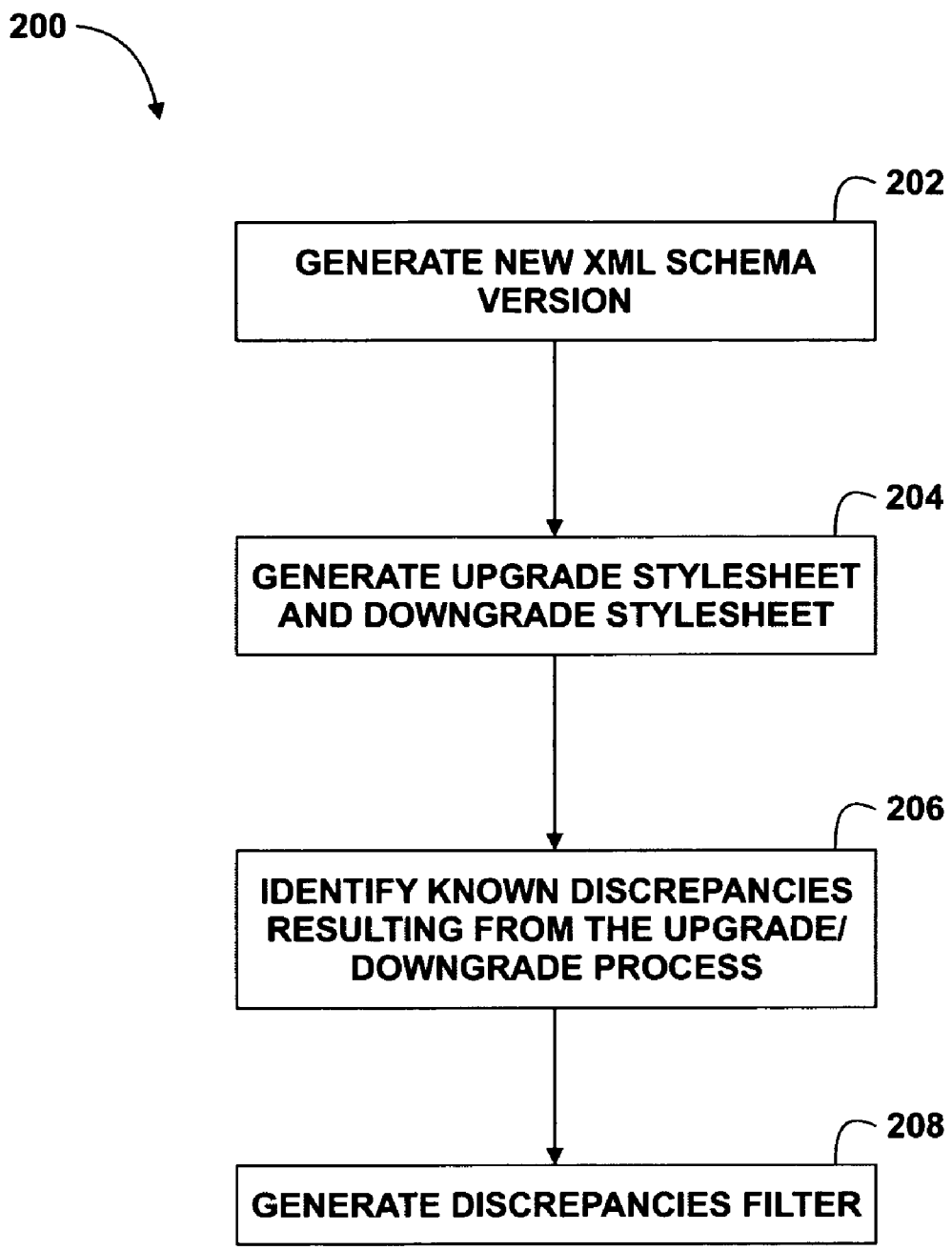
FIG. 2 is a flow diagram illustrating an exemplary method for generating an upgrade stylesheet, a downgrade stylesheet, and a filter document for schema version transform discrepancies in accordance with at least one embodiment of the present disclosure.
Figure 3:
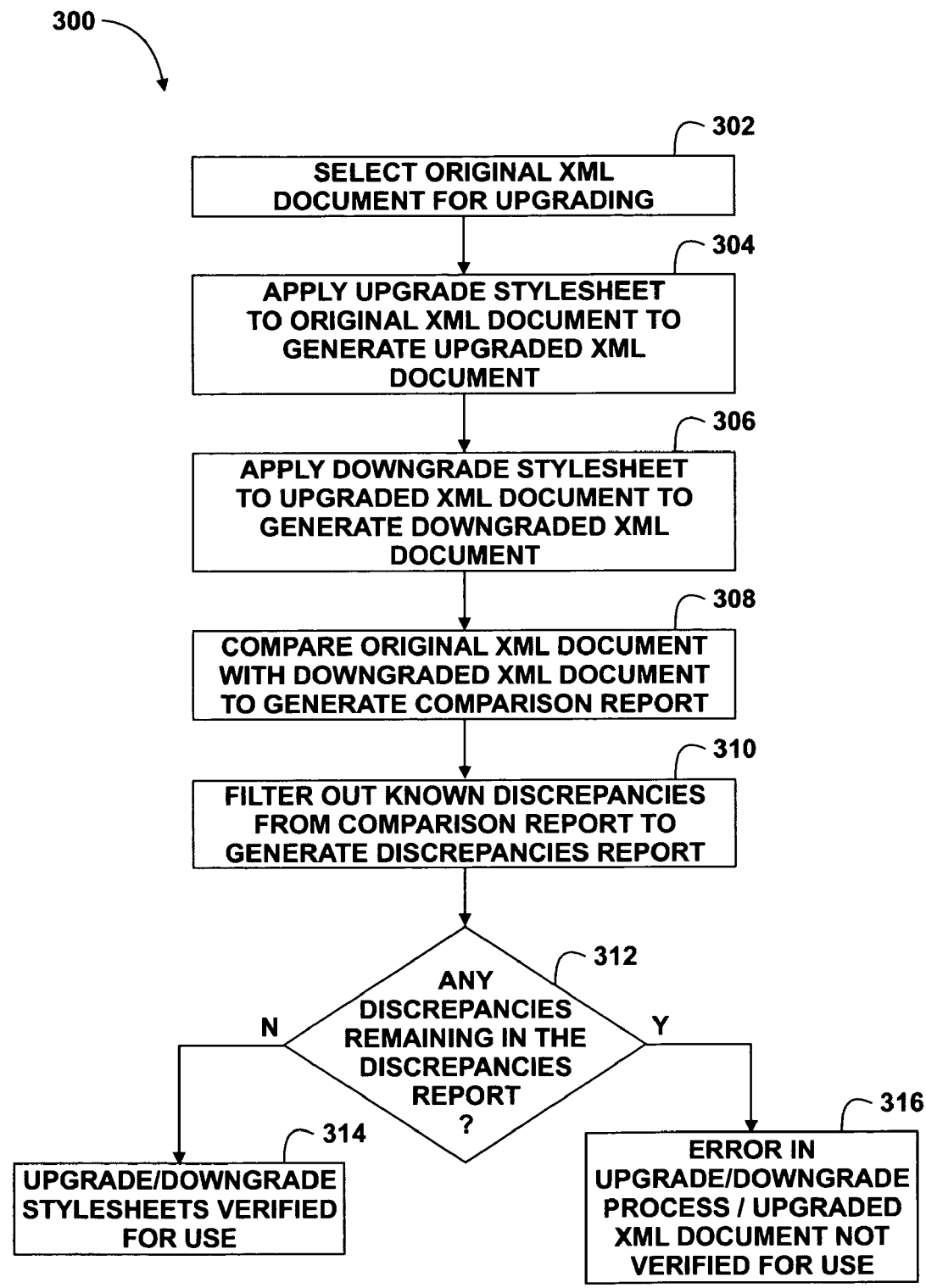
FIG. 3 is flow diagram illustrating an exemplary method for verifying the suitability of an upgrade transform and a downgrade transform for a markup language document in accordance with at least one embodiment of the present disclosure.

Referring to FIGS. 2 and 3, an exemplary technique for determining the suitability of an upgrade stylesheet and a downgrade stylesheet is illustrated in accordance with at least one embodiment of the present disclosure. Specifically, FIG. 2 illustrates an exemplary method 200 for generating a discrepancies filter and FIG. 3 illustrates an exemplary method 300 for comparing an original document to a downgraded document and filtering the results using the discrepancies filter so as to verify whether the upgrade stylesheet and downgrade stylesheets are suitable for use.

The method 200 includes generating a new XML schema version from a prior XML schema version at block 202. The new XML schema version may be generated in response to additional requirements for a process that uses XML documents based on the schema. To illustrate, a process may require certain elements, attributes or attribute values that are not present in the prior XML schema version. Alternately, the logical structure of certain elements may need to change so as to accommodate a different process. The generation of the new schema version therefore can include adding new attributes to existing elements, removing attributes from existing elements, adding new elements, removing elements, modifying attribute values (e.g., from "yes" or "no" to "true" or "false"), and the like. Schema changes also can include, but are not limited to: changing the number of allowed elements (e.g. there can be zero to one occurrences, there could be zero to infinity, there could be one to infinity); changing the requirements of attribute existence (e.g. an attribute might be required in one schema but optional in another); changing the type of an element or attribute, where exemplary types can include string, integer, float, boolean, complex, etc; changing the enumerated set of allowed values for an element or attribute; and moving an element to another location in the schema.

At block 204, the method 200 includes generating an upgrade stylesheet and a downgrade stylesheet based on the prior XML schema version and the new XML schema version. In one embodiment, the upgrade stylesheet and downgrade stylesheet are crafted by a user based on an analysis of the two XML schema versions.

It will be appreciated that a suitable upgrade stylesheet, when applied, converts an XML document consistent with a prior XML schema version to an XML document consistent with the new XML schema version without introducing artifacts that negatively affect the interpretation of the new XML document by a process. Likewise, it will be appreciated that a suitable downgrade XML stylesheet, when applied, converts an XML document consistent with the new XML schema version to an XML document consistent with a prior XML schema version without introducing artifacts that negatively affect the interpretation of the new XML document by a process. However, as noted above, XML schemas, and the XML documents to which they apply, can be very complex. As a result, a user-crafted stylesheet can introduce unintended, material errors into the resulting transformed XML document, thereby rendering the stylesheet unsuitable for use. Accordingly, at block 206, the method 200 includes identifying known discrepancies resulting from the upgrade/downgrade process. These discrepancies can be identified based on an analysis of the schema versions and the upgrade/downgrade stylesheets. Alternately, the upgrade/downgrade process can be performed on a test XML document and the results of the process can be analyzed to determine certain discrepancies resulting from the upgrade/downgrade process.

At block 208, the method 200 includes generating a discrepancies filter based on the discrepancies identified at block 206. As discussed above, the discrepancies filter, when applied to a comparison report, filters out the known discrepancies so that only previously unidentified discrepancies remain. The discrepancies filter itself can include an XML stylesheet.

Turning to FIG. 3, the method 300 includes selecting an original XML document for upgrade at block 302, where the original XML document is based on the first schema version. At block 304, the method 300 includes applying the upgrade stylesheet generated at block 204 of FIG. 2 to the original XML document to generate an upgraded XML document that is expected to be consistent with the second schema version if the upgrade stylesheet is accurate. At block 306, the method 300 includes applying the downgrade stylesheet generated at block 204 of FIG. 2 to the upgraded XML document to generate a downgraded XML document that is expected to be consistent (e.g., substantially identical in function) to the original XML document if the upgrade stylesheet and the downgrade stylesheet are accurate.

At block 308, the method 300 includes comparing the original XML document with the downgraded XML document to generate a comparison report that identifies discrepancies, if any, between the original XML document and the downgraded XML document. As noted above, the comparison algorithm can include a recursive comparison of elements of the document arranged in a tree structure of root element. Accordingly, for the comparison of an element (element 1) of the original XML document (which may not be present) with a corresponding element (element 2) of the downgraded XML document (which may not be present). The value of element 1 (if it has one) is obtained and it is compared to the value of element 2. If they are different, the element is identified as changed and the new and old values and their location are noted. Next, all of the attributes of element 1 are identified by name and value. For each attribute in element 1's list, a look up of the attribute by name in element 2 is performed. If the attribute is found in element 2 but the value is different than the value in element 1, the attribute is identified as changed and the new and old values and the location in the document are noted. If the attribute cannot be found in element 2, the attribute is identified as missing and the location in the document is noted. Next, all of the attributes of element 2 are placed in a list and the names of the attributes are looked up in element 1. Those not found are identified as added attributes and the location in the document is noted. Subsequently, lists of all of the child elements of elements 1 and 2 are obtained. If both element 1 and element 2 have one child, the algorithm is applied recursively to those two child elements. Otherwise, a map is made of the child elements of element 2. This map is keyed by a construction of the element name along with the values of all of the attributes of that element. For each of the child elements of element 1 a key is constructed and used to do a lookup in the element 2 map. If an element is found in the map, this algorithm is applied recursively using the child from element 1 and the child from element 2 found in the map and the child element is removed from the map. If the map yields no hit from the lookup, an element is identified as missing and all attributes and child elements of that element are identified missing. When the list of children from element 1 has been exhausted, whether there are any elements left in the map is determined. If there are any elements left, the remaining elements are identified as added elements and as are all attributes and child elements of that element.

At block 310, the method 300 includes applying the discrepancies filter generated at block 210 of FIG. 2 to the comparison report to filter out any known discrepancies. The remaining deficiencies, if any, are identified in a discrepancies report. At decision block 312, the discrepancies report is analyzed to determine whether any discrepancies remain after filtering. If no discrepancies remain (e.g., the discrepancies report is empty), at block 314 the upgrade stylesheet and downgrade stylesheets generated at block 204 of FIG. 2 are verified as suitable for use in transforming XML documents between schema versions. Otherwise, if one or more discrepancies remain, at block 316 the upgrade stylesheet and downgrade stylesheet are marked as unsuitable for use. A user then can take corrective action. To illustrate, if the discrepancies are immaterial to proper operation, the user can override the failed verification and add the identified discrepancies to the discrepancies filter so that they are removed from subsequent comparison reports. Alternately, if some or all of the discrepancies are material, the user can refine the upgrade stylesheet and downgrade stylesheet to correct' for these discrepancies.

Figure 4:
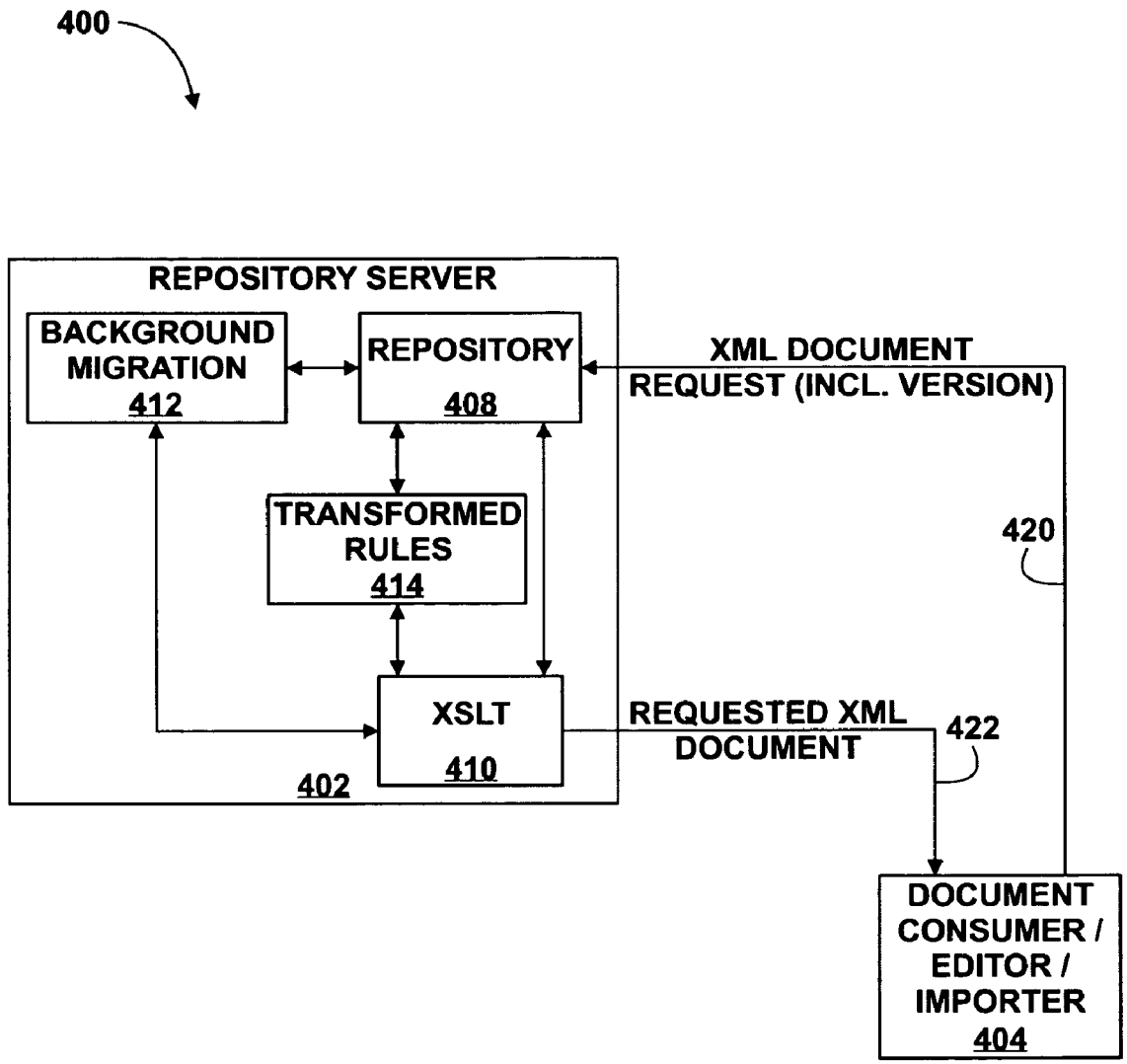
FIG. 4 is a block diagram illustrating an exemplary document server system utilizing a markup language document repository in accordance with at least one embodiment of the present disclosure.

Referring to FIG. 4, an exemplary implementation of the repository system 100 is illustrated in accordance with at least one embodiment of the present disclosure. In the depicted example, a document server system 100 includes a repository server 402 and a document consumer/editor/importer 404 (hereinafter, document consumer 404). The document consumer 404 utilizes XML documents provided by the repository server 402 to control an operation of one or more processes. To illustrate, in one embodiment, the document consumer 404 represents an equipment interface to, for example, semiconductor fabrication equipment, where one or more operations of the semiconductor fabrication equipment are controlled or otherwise guided by XML documents processed by the equipment interface.

The repository server 402 includes a repository 408, an XLST transform module 410 (e.g., the XLST transform module 108, FIG. 1), a background migration module 412 and a transforms data store 414. The repository 408 includes one or more data stores to store XML documents for provision to the document consumer 404. The transforms data store 414 stores upgrade and downgrade transform information in the form of, for example, stylesheets. The transforms data store 414 further includes comparison reports, discrepancies filters, and discrepancies reports, as discussed above.

In operation, the document consumer 404 provides a document request 420 to the repository server 402. In one embodiment, different document consumers 404 are capable of handling different schema versions. To illustrate, one document consumer 404 may be configured to process XML documents consistent with schema version 2.0, whereas another document consumer 404 may be configured to process only XML documents consistent with schema version 1.0. Accordingly, the document request 420, can include an indicator of the schema version required in addition to an identifier associated with the requested XML document.

In the event that the requested XML document is available in the indicated schema version at the repository 408, the repository server 402 sends a document response 422 that includes the requested XML document to the document consumer 404. Otherwise, if the indicated schema version of the requested XML document is not available, the repository 408 selects a different schema version of the requested XML document and provides the alternate XML document to the XLST transform module 410. The repository 408 also provides the upgrade stylesheet or the downgrade stylesheet necessary to convert the alternate XML document to the schema version requested by the document consumer 404. To illustrate, if the alternate XML document is consistent with schema version 1.0 and the document consumer 404 requests an XML document consistent with schema version 2.0, the repository 408 provides an upgrade stylesheet from the transforms data store 414 to the XLST module 410, along with the alternate XML document. Conversely, if the XML document is consistent with the schema version 3.0 and the document consumer 404 requests an XML document consistent with schema version 2.0, the repository 408 provides a downgrade stylesheet from the transforms data store to the XLST module 410, along with the alternate XML document. The XLST module 410 applies the supplied stylesheet to the alternate XML document to generate a converted XML document consistent with the requested schema version. The XLST module 410 then provides the converted XML document to the document consumer 404 as the document response 422.

In addition to converting XML documents on-the-fly in response to document requests from document consumers, in one embodiment, the background migration module 412 selects XML documents for conversion between schema versions during lulls in the document accesses at the repository server 402. After selecting an XML document at the repository 408, the background migration module 412 provides the selected XML document and an upgrade stylesheet or downgrade stylesheet to the XLST module 410. The XLST module 410 converts the selected XML document based on the stylesheet and provides the converted XML document to the repository 408. The repository module 408 then can either replace the original XML document with the converted XML document or store the converted XML document in addition to the original XML document.

To assist in the understanding of the techniques of the present disclosure, an example of the upgrade/downgrade and verification processes of FIGS. 1-4 is depicted in the following Tables 1-17.

TABLE 1

Execution Script call xform DocToUpgrade.xml schema1to2.xsl DocUpgraded.xml
call xform DocUpgraded.xml schema 2to1.xsl DocDowngraded.xml
call xform CompareReport.xml schema1to2filter.xsl
CompareReportFiltered.xml Table 1 illustrates the execution script utilized to initiate and perform the verification process. The first script line calls an XLST transform application "xform" (e.g., the XLST module 108 and the filter/verify module 112, FIG. 1) to apply the upgrade transform represented by the stylesheet "schema1to2.xsl" to convert the document "DocToUpgrade.xml" to an upgraded document "DocUpgraded.xml." The second script line calls the XLST transform application to apply the downgrade transform represented by the stylesheet "schema2to1.xsl" to convert the document "DocUpgraded.xml" to a downgraded document "DocDowngraded.xml." The downgraded document "DocDowngraded.xml" then is compared to the original document "DocToUpgrade.xml" to generate a comparison report "CompareReport.xml" using, for example, a Java-based comparison engine. The third script line calls the XLST transform application to apply the discrepancies filter "schema1to2filter.xsl" to the comparison report "CompareReport.xml" to generate the discrepancies report "CompareReportFiltered.xml." The discrepancies report "CompareReportFiltered.xml" then can be analyzed to verify whether the upgrade stylesheet "schema1to2.xsl" and the downgrade stylesheet "schema2to1.xsl" as suitable for use.

Table 2 illustrates an XML document representative of an original schema version (schema 1) and Table 3 illustrates an XML document representative of a new schema version (schema 2). Table 4 illustrates the XML document "DocToUpgrade.xml" consistent with schema 1. Table 5 illustrates the upgrade stylesheet "schema1to2.xsl." Table 6 illustrates the upgraded XML document "DocUpgraded.xml." Table 7 illustrates the downgrade stylesheet "schema2to1.xsl." Table 8 illustrates the downgraded XML document "DocDowngraded.xml." Table 9 illustrates the comparison report "CompareReport.xml." Table 10 illustrates the discrepancies filter "schema1to2filter.xsl." Table 11 illustrates the discrepancies report "CompareReportFiltered.xml." Table 12 illustrates an XML document used to configure and guide the XML document comparison.

TABLE 2

Original Schema Version (Schema 1)

```
<?xml version="1.0" encoding="UTF-8"?>
<xs:schema xmlns:xs="http://www.w3.org/2001/XMLSchema"
elementFormDefault="qualified" attributeFormDefault="unqualified">
    <xs:element name="ParkReservations">
        <xs:complexType>
            <xs:sequence minOccurs="0" maxOccurs="unbounded">
                <xs:element name="Reservation">
                    <xs:complexType>
                        <xs:sequence>
                            <xs:element name="Function">
                                <xs:complexType>
                                    <xs:attribute
name="Sport" use="required">
    <xs:simpleType>
    <xs:restriction base="xs:string">
    <xs:enumeration value="Soccer"/>
    <xs:enumeration value="Football"/>
    <xs:enumeration value="Baseball"/>
    <xs:enumeration value="Rugby"/>
    <xs:enumeration value="Basketball"/>
    <xs:enumeration value="Volleyball"/>
    <xs enumeration value="Ultimate Frisbee"/>
    <xs enumeration value="Unknown"/>
    </xs:restriction>
    </xs simpleType>
                                                </xs:attribute>
                                                <xs:attribute
name="LightingNeeded" use="optional">
    <xs:simpleType>
```

TABLE 2-continued

Original Schema Version (Schema 1)

```
        <xs:restriction base="xs:string">
            <xs:enumeration value="No"/>
            <xs:enumeration value="Yes"/>
            <xs:enumeration value="Do not care"/>
        </xs:restriction>
        </xs:simpleType>
                            </xs:attribute>
                        </xs:complexType>
                    </xs:element>
                    <xs:element name="Equipment" minOccurs="0" maxOccurs="unbounded">
                        <xs:complexType>
                            <xs:attribute name="ItemName" use="required">
                                <xs:simpleType>
                                    <xs:restriction base="xs string">
                                        <xs:enumeration value="Goal Posts"/>
                                        <xs:enumeration value="Baseballs"/>
                                        <xs:enumeration value="Footballs"/>
                                        <xs:enumeration value="Basketballs"/>
```

TABLE 2-continued

Original Schema Version (Schema 1)

```
                                        <xs:enumeration value="Nets"/>
                                        <xs:enumeration value="Volleyballs"/>
                                        <xs:enumeration value="Bats"/>
                                        <xs:enumeration value="Bases"/>
                                        <xs:enumeration value="Goals"/>
                                    </xs:restriction>
                                </xs:simpleType>
                            </xs:attribute>
                        </xs:complexType>
                    </xs:element>
                </xs:sequence>
            </xs:complexType>
        </xs:element>
    </xs:sequence>
    <xs:attribute name="schemaVersion" type="xs:string" use="required"/>
    </xs:complexType>
    </xs:element>
</xs:schema>
```

TABLE 3

New Schema Version (Schema 2)

```
<?xml version="1.0" encoding="UTF-8"?>
<xs:schema xmlns:xs="http://www.w3.org/2001/XMLSchema"
elementFormDefault="qualified" attributeFormDefault="unqualified">
    <xs:element name="ParkReservations">
        <xs:complexType>
            <xs:sequence minOccurs="0" maxOccurs="unbounded">
                <xs:element name="Reservation">
                    <xs:complexType>
                        <xs:sequence>
                            <xs:element name="Function">
                                <xs:complexType>
                                    <xs:attribute name="Sport" use="required">
                                        <xs:simpleType>
                                            <xs:restriction base="xs:string">
                                                <xs:enumeration value="Football"/>
                                                <xs:enumeration value="Baseball"/>
                                                <xs:enumeration value="Rugby"/>
                                                <xs:enumeration value="Basketball"/>
                                                <xs:enumeration value="Volleyball"/>
                                                <xs:enumeration value="Ultimate Frisbee"/>
                                                <xs:enumeration value="Unknown"/>
                                            </xs:restriction>
                                        </xs:simpleType>
                                    </xs:attribute>
                                    <xs:attribute name="LightingNeeded" type="xs:boolean" use="optional"/>
                                </xs:complexType>
                            </xs:element>
                            <xs:element name="Equipment" minOccurs="0" maxOccurs="unbounded">
                                <xs:complexType>
                                    <xs:attribute name="ItemName" use="required">
                                        <xs:simpleType>
                                            <xs:restriction base="xs:string">
                                                <xs:enumeration value="Goal Posts"/>
                                                <xs:enumeration value="Baseballs"/>
                                                <xs:enumeration value="Footballs"/>
                                                <xs:enumeration value="Basketballs"/>
                                                <xs:enumeration value="Nets"/>
                                                <xs:enumeration value"Volleyballs"/>
                                                <xs:enumeration value="Bats"/>
                                                <xs:enumeration value="Bases"/>
                                            </xs:restriction>
                                        </xs:simpleType>
                                    </xs:attribute>
                                </xs:complexType>
                            </xs:element>
```

TABLE 3-continued

New Schema Version (Schema 2)

```
                </xs:sequence>
              </xs:complexType>
            </xs:element>
          </xs:sequence>
          <xs:attribute name="schemaVersion" type="xs string" use="required"/>
      </xs:complexType>
    </xs:element>
</xs:schema>
```

TABLE 4

DocToUpgrade.xml

```
<?xml version="1.0" encoding="UTF-8"?>
<ParkReservations schemaVersion="1">
    <Reservation>
        <Function Sport="Baseball" LightingNeeded="Yes"/>
        <Equipment ItemName="Baseballs"/>
        <Equipment ItemName="Bats"/>
    </Reservation>
    <Reservation>
        <Function Sport="Soccer" LightingNeeded=
```

TABLE 4-continued

DocToUpgrade.xml

```
"No"/>
        <Equipment ItemName="Goals"/>
    </Reservation>
    <Reservation>
        <Function Sport="Volleyball" LightingNeeded="Do not care"/>
        <Equipment ItemName="Volleyballs"/>
    </Reservation>
</ParkReservations>
```

TABLE 5 schema1to2.xsl

```
<?xml version="1.0" encoding="ISO-8859-1"?>
<xsl:stylesheet version="1.0"
    xmlns:xsl="http://www.w3.org/1999/XSL/Transform">
<xsl:output method="xml" encoding="UTF-8" indent="yes"/>
<xsl:strip-space elements="*"/>
<!--
This document needs to:
    1. Put "2" in ParkReservations/@schemaVersion
    2. If ParkReservations/Reservation/Funtion/@Sport is "Soccer" change it
to "Unknown"
    3. If ParkReservations/Reservation/Function/@LightingNeeded is "Yes"
change it to "true", "No" to "false" and remove it if "Do not care"
    4. If ParkReservations/Reservation/Equipment/@ItemName is "Goals",
remove the Equipment element
-->
<xsl:param name="SchemaVersion" select="'2'"/>
<xsl:template match="ParkReservations">
    <xsl:element name="{name( )}">
        <xsl:for-each select="@*">
            <xsl:choose>
                <!-- Requirement #1 - change the schemaVersion -->
                <xsl:when test="name( ) = 'schemaVersion'">
                    <xsl:attribute name="schemaVersion">
                        <xsl:value-of select="$SchemaVersion"/>
                    </xsl:attribute>
                </xsl:when>
                <xsl:otherwise>
                    <xsl:copy-of select="."/>
                </xsl:otherwise>
            </xsl:choose>
        </xsl:for-each>
        <xsl:apply-templates select="*"/>
    </xsl:element>
</xsl:template>
<xsl:template match="Function/@Sport">
    <!-- Requirement #2 - no Soccer -->
    <xsl:choose>
        <xsl:when test=". = 'Soccer'">
            <xsl:attribute name="{name( )}">
                <xsl:text>Unknown</xsl:text>
```

TABLE 5-continued schema1to2.xsl

```
            </xsl:attribute>
          </xsl:when>
          <xsl:otherwise>
              <xsl:copy-of select="."/>
          </xsl:otherwise>
      </xsl:choose>
</xsl:template>
<xsl:template match="Function/@LightingNeeded">
      <!-- Requirement #3 - change the LightingNeeded to boolean -->
      <xsl:choose>
          <xsl:when test=". ='Yes'">
              <xsl:attribute name="{name( )}">
                  <xsl:text>true</xsl:text>
              </xsl:attribute>
          </xsl:when>
          <xsl:when test=". ='No'">
              <xsl:attribute name="{name( )}">
                  <xsl:text>false</xsl:text>
              </xsl:attribute>
          </xsl:when>
      </xsl:choose>
</xsl:template>
<!-- Requirement #4 - no Goals remove the whole element -->
<xsl:template match="Equipment">
      <xsl:if test="@ItemName != 'Goals'">
          <xsl:element name="{name( )}">
              <xsl:apply-templates select="@*"/>
          </xsl:element>
      </xsl:if>
</xsl:template>
<!-- Identity template for attributes, text, and comments-->
<xsl:template match='@*|text( )|comment( )'>
      <xsl:copy>
          <xsl:apply-templates/>
      </xsl:copy>
</xsl:template>
<!-- Identity template for elements -->
<xsl:template match="*">
      <xsl:element name="{name( )}">
          <xsl:apply-templates select="@*"/>
          <xsl:apply-templates select="text( )"/>
          <xsl:apply-templates select="comment( )"/>
          <xsl:apply-templates select"*"/>
      </xsl:element>
</xsl:template>
</xsl:stylesheet>
```

TABLE 6

DocUpgraded.xml

```
<?xml version="1.0" encoding="UTF-8"?>
<ParkReservations schemaVersion="1">
      <Reservation>
          <Function Sport="Baseball" LightingNeeded="Yes"/>
          <Equipment ItemName="Baseballs"/>
          <Equipment ItemName="Bats"/>
      </Reservation>
      <Reservation>
          <Function Sport="Soccer" LightingNeeded=
```

TABLE 6-continued

DocUpgraded.xml

```
"No" />
          <Equipment ItemName="Goals"/>
      </Reservation>
      <Reservation>
          <Function Sport="Volleyball" LightingNeeded=
"Do not care"/>
          <Equipment ItemName="Volleyballs"/>
      </Reservation>
</ParkReservations>
```

TABLE 7 schema2to1.xsl

```
<?xml version="1.0" encoding="ISO-8859-1"?>
<xsl:stylesheet version="1.0"
xmlns:xsl="http://www.w3.org/1999/XSL/Transform">
<xsl:output method="xml" encoding="UTF-8" indent="yes"/>
<xsl:strip-space elements="*"/>
```

TABLE 7-continued schema2to1.xsl

```
<!--
This document needs to:
    1. Put "1" in ParkReservations/@schemaVersion
    2. If ParkReservations/Reservation/Function/@LightingNeeded is "true"
change it to "Yes", "false" to "No"
-->
<xsl:param name="SchemaVersion" select="'1'"/>
<xsl:template match="ParkReservations">
        <xsl:element name="{name( )}">
                <xsl:for-each select="@*">
                        <xsl:choose>
                                <!-- Requirement #1 - change the schemaVersion -->
                                <xsl:when test="name( ) = 'schemaVersion'">
                                        <xsl:attribute name="schemaVersion">
                                                <xsl:value-of
select="$SchemaVersion"/>
                                        </xsl:attribute>
                                </xsl:when>
                                <xsl:otherwise>
                                        <xsl:copy-of select="."/>
                                </xsl:otherwise>
                        </xsl:choose>
                </xsl:for-each>
                <xsl:apply-templates select="*"/>
        </xsl:element>
</xsl:template>
<xsl:template match="Function/@LightingNeeded">
        <!-- Requirement #2 - change the LightingNeeded to Yes/No -->
        <xsl:choose>
                <xsl:when test=". = 'true'">
                        <xsl:attribute name="{name( )}">
                                <xsl:text>Yes</xsl:text>
                        </xsl:attribute>
                </xsl:when>
                <xsl:when test=". = 'false'">
                        <xsl:attribute name="{name( )}">
                                <xsl:text>No</xsl:text>
                        </xsl:attribute>
                </xsl:when>
        </xsl:choose>
</xsl:template>
<!-- Identity template for attributes, text, and comments-->
<xsl:template match='@*|text( )|comment( )'>
        <xsl:copy>
                <xsl:apply-templates/>
        </xsl:copy>
</xsl:template>
<!-- Identity template for elements -->
<xsl:template match="*">
        <xsl:element name"{name( )}">
                <xsl:apply-templates select="@*"/>
                <xsl:apply-templates select="text( )"/>
                <xsl:apply-templates select="comment( )"/>
                <xsl:apply-templates select="*"/>
        </xsl:element>
</xsl:template>
        </xsl:stylesheet>
```

TABLE 8

DocDowngraded.xml

```
<?xml version="1.0" encoding="UTF-8"?>
<ParkReservations schemaVersion="1">
        <Reservation>
                <Function Sport="Baseball" LightingNeeded=
"Yes"/>
                <Equipment ItemName="Baseballs"/>
                <Equipment ItemName="Bats"/>
        </Reservation>
        <Reservation>
                <Function Sport="Unknown" LightingNeeded=
"No"/>
        </Reservation>
        <Reservation>
                <Function Sport="Volleyball"/>
                <Equipment ItemName="Volleyballs"/>
        </Reservation>
</ParkReservations>
```

TABLE 9

CompareReport.xml

```xml
<?xml version="1.0" encoding="UTF-8"?>
<bc:ComparisonReport
xmlns:bc="http://www.amd.com/schemas/Compare/3_0_0">
        <bc:Discrepancy type="AttributeChange">
                <bc:Xpath>ParkReservations/Reservation/Function</bc:Xpath>
                <bc:Location>ParkReservations/Reservation/Function</bc:Location>
                <bc:Attribute old="Soccer" new="Unknown">Sport</bc:Attribute>
        </bc:Discrepancy>
        <bc: Discrepancy type="ElementMissing">
                <bc:XPath>ParkReservations/Reservation</bc:XPath>
                <bc:Location>ParkReservations/Reservation</bc:Location>
                <bc:Element>Equipment</bc:Element>
        </bc:Discrepancy>
        <bc:Discrepancy type="AttributeMissing">
                <bc:Xpath>ParkReservations/Reservation/Function</bc:XPath>
                <bc:Location>ParkReservations/Reservation/Function</bc:Location>
                <bc:Attribute new="Do not care">LightingNeeded</bc:Attribute>
        </bc:Discrepancy>
</bc:ComparisonReport>
```

TABLE 10 schema1to2filter.xsl

```xml
<?xml version="1.0" encoding="ISO-8859-1"?>
<xsl:stylesheet version="1.0"
xmlns:xsi="http://www.w3.org/1999/XSL/Transform"
xmlns:bc="http://www.amd.com/schemas/Compare/3_0_0">
<!--
   Known verification discrepancies that are acceptable and must be
removed from the comparison report
   1. @LightingNeeded may be missing
   2. @Sport may change from 'Soccer' to 'Unknown'
   3. Equipment element may be missing
-->
<xsl:template match="@*|node( )">
        <xsl:copy>
                <xsl:apply-templates select="@*|node( )"/>
        </xsl:copy>
</xsl:template>
<xsl:template match="bc:Discrepancy">
        <xsl:choose>
                <xsl:when test="@type = 'AttributeMissing'">
                        <xsl:choose>
                                <!-- Requirement #1 -->
                                <xsl:when test="bc:Attribute = 'LightingNeeded'">
                                </xsl:when>
                                <xsl:otherwise>
                                        <xsl:copy-of select="."/>
                                </xsl:otherwise>
                        </xsl:choose>
                </xsl:when>
                <xsl:when test="@type ='AttributeChange'">
                        <xsl:choose>
                                <!-- Requirement #2 -->
                                <xsl:when test="bc:Attribute = 'Sport' and bc:Attribute/@old = 'Soccer' and bc:Attribute/@new = 'Unknown'">
                                </xsl:when>
                                <xsl:otherwise>
                                        <xsl:copy-of select="."/>
                                </xsl:otherwise>
                        </xsl:choose>
                </xsl:when>
                <xsl:when test="@type = 'ElementMissing'">
                        <xsl:choose>
                                <!-- Requirement #3 -->
                                <xsl:when test="bc:Element = 'Equipment'">
                                </xsl:when>
                                <xsl:otherwise>
                                        <xsl:copy-of select="."/>
                                </xsl:otherwise>
                        </xsl:choose>
                </xsl:when>
        </xsl:choose>
</xsl:template>
</xsl:stylesheet>
```

TABLE 11

CompareReportFiltered.xml

```
<?xml version="1.0" encoding="UTF-8"?>
<bc:ComparisonReport
```

TABLE 11-continued

CompareReportFiltered.xml

```
    xmlns:bc="http://www.amd.com/schemas/Compare/3_0_0">
</bc:ComparisonReport>
```

TABLE 12

Comparison XML Document

```
<?xml version="1.0" encoding="UTF-8"?>
<xs:schema xmlns:xs="http://www.w3.org/2001/XMLSchema"
xmlns:bc="http://www.website.com/schemas/1_0_0"
targetNamespace="http://www.website.com/schemas/1_0_0"
elementFormDefault="qualified" attributeFormDefault="unqualified">
    <xs:element name="ComparisonReport">
        <xs:annotation>
        </xs:annotation>
        <xs:complexType>
            <xs:sequence>
                <xs:element name="Discrepancy" minOccurs="0" maxOccurs="unbounded">
                    <xs:complexType>
                        <xs:complexContent>
                            <xs:extension base="bc:DiscrepancyType"/>
                        </xs:complexContent>
                    </xs:complexType>
                </xs:element>
            </xs:sequence>
        </xs:complexType>
    </xs:element>
    <xs:complexType name="DiscrepancyType">
        <xs:sequence>
            <xs:element name="XPath" type="xs:string"/>
            <xs:element name="Location" type="xs:string"/>
            <xs:element name="Element" minOccurs="0">
                <xs:complexType>
                    <xs:simpleContent>
                        <xs:extension base="xs:string">
                            <xs:attribute name="old" type="xs:string"/>
                            <xs:attribute name="new" type="xs:string"/>
                        </xs:extension>
                    </xs:simpleContent>
                </xs:complexType>
            </xs:element>
            <xs:element name="Attribute" minOccurs="0">
                <xs:complexType>
                    <xs:simpleContent>
                        <xs:extension base="xs:string">
                            <xs:attribute name="old" type="xs:string" use="optional"/>
                            <xs:attribute name="new" type="xs:string" use="optional"/>
                        </xs:extension>
                    </xs:simpleContent>
                </xs:complexType>
            </xs:element>
        </xs:sequence>
        <xs:attribute name="type" use="required">
            <xs:simpleType>
                <xs:restriction base="xs:string">
                    <xs:enumeration value="AttributeChange"/>
                    <xs:enumeration value="AttributeAdded"/>
                    <xs:enumeration value="AttributeMissing"/>
                    <xs:enumeration value="ElementChange"/>
                    <xs:enumeration value="ElementAdded"/>
                    <xs:enumeration value="ElementMissing"/>
                </xs:restriction>
            </xs:simpleType>
        </xs:attribute>
    </xs:complexType>
</xs:schema>
```

Schema 1 of Table 1 describes a representation of data store records in a park reservation system as they are sent over the network in simple object access protocol (SOAP) messages to a web-based client. As illustrated by schema 1, a "Reservation" record includes a single "Function" element and that element has a "Sport" attribute which can take on values of "Soccer", "Football", "Baseball", etc. and a "LightingNeeded" attribute which can take on values of "Yes", "No" and "Do not care". The "Sport" attribute is required and the "LightingNeeded" attribute is optional. The "Reservation" record also can contain one or more "Equipment" elements that a user can attempt to reserve from the park. The "Equipment" element has one mandatory "ItemName" attribute that can take on values of "Goal Posts," "Baseballs," "Footballs," etc. As illustrated, the XML document "DocToUpgrade.xml" of Table 3 contains three "Reservation" records. Each one of these demonstrates an issue that is identified using the verification technique described above.

Assume for this example that the park's soccer goals have been vandalized and there is no money to repair them. For the foreseeable future, there will be no reservations for the sport of "Soccer" and it will not be possible to reserve the equipment identified as "Goals." Accordingly, schema 2 of Table 2 can be implemented to remove reference to these now-inaccessible elements. As illustrated, both "Soccer" and "Goals" have been removed from their respective enumerated lists in schema 2. In addition, the "LightingNeeded" field is changed from a string value to a boolean value so that it only accepts values of "true" and "false."

In order to verify that an XSLT transform applied to an XML document in the park's repository is not going to have adverse effects on its business, a verification process is performed, where the verification process includes upgrading the XML document to conform to a new schema version, downgrading the XML document back to its original schema version, and then comparing the original with the twice-transformed document. This process flushes out errors in the upgrade/downgrade process due to coding errors often inherent in any software production endeavor. As illustrated by the application of the upgrade stylesheet "schema1to2.xls" (Table 4) to the XML document "DocToUpgrade.xml" (Table 3) and the application of the downgrade stylesheet "schema2to1.xls" (Table 7) to the XML document "DocUpgraded.xml" (Table 6), the two documents "DocToUpgrade.xml" and "DocDowngraded.xml" can differ, but in known, predictable ways.

One item that the upgrade stylesheet "schema1to2.xls" does is changes the "schemaVersion" attribute from "1" to "2," and the downgrade stylesheet "schema2to1.xls" changes it back to "1." At compare time, there will be no indication that anything changed. Another upgrade made by the upgrade stylesheet "schema1to2.xls" includes changing all records that contain a "Sport" of "Soccer" to another value because Sport is a required attribute. In the illustrated example, the value of "Sport" is changed to "Unknown". At downgrade, it cannot be determined if a record previously was a "Soccer" record or if it truly was an "Unknown" record so no change is made. At compare time, it will appear that the "Sport" attribute changed from "Soccer" to "Unknown". In the upgrade stylesheet "schema1to2.xls," the values for "LightingNeeded" change from "Yes" and "No" to "True" or "False", but nothing is done with "Do not care." Because this attribute is optional, it is dropped. At downgrade, "True" is changed to "Yes" and "False" is changed to "No", but there will be nothing to indicate whenever a "Do not care" value should be put back in. Accordingly, at compare time, it appears that the "LightingNeeded" attribute is missing for those which originally held "Do not care." Turning to the "Equipment" element, attribute "ItemNames" with a value of "Goals" are not allowed according to the new schema. Because the "Equipment" element contains only the "ItemName" attribute, which is a required attribute, the entire element will be removed during upgrade if the "ItemName" attribute has a value of "Goals". At downgrade there will be no indication that there was ever an element there so nothing will be inserted. At compare time, it will appear as though the "Equipment" element is missing. In summary, upgrade/downgrade process can cause the following changes to the original XML document: attributes may change value, attributes may be missing, and elements may be missing.

Because there are predictable differences (as discussed above), the two XML documents "DocToUpgrade.xml" and "DocDowngraded.xml" can be compared and the predictable differences filtered out. Accordingly, a comparison XML document (Table 12) is used to "walk" the two XML documents, detect differences, and characterize those differences in the comparison report "CompareReport.xml," which is an XML document in the format specified by compare software. As illustrated by the comparison report "CompareReport.xml," three discrepancy records exist. One is an "AttributeChange" discrepancy record, one is an "AttributeMissing" discrepancy record, and one is an "ElementMissing" discrepancy record. Other discrepancy records (not illustrated) can include an "ElementChange" discrepancy record, an "ElementAdded" discrepancy record, an "AttributeAdded" discrepancy record, and the like.

Because the comparison report is an XML document in this example, a discrepancies filter "schema2to1filter.xls" that filters out all expected discrepancies can be applied in the form of a stylesheet, thereby leaving only unexpected or previously unidentified discrepancies. Applying that stylesheet "schema2to1filter.xls" to "CompareReport.xml" yields "CompareReportFiltered.xml," which turns out to be an empty document, thereby indicating that only known, predicted differences were found between the original XML document "DocToUpgrade.xml" and the XML document "DocDowngraded.xml" that was produced by upgrading and then downgrading. Accordingly, the stylesheets "schema1to2.xsl" and "schema2to2.xsl" can be verified as suitable for use in upgrading and downgrading XML documents.

Tables 13-17 illustrate another example whereby a discrepancy (i.e., a "bug") is present in the upgrade stylesheet (Table 13) used to transform the XML document "DocToUpgrade.xml" (Table 4) from the original schema version (schema 1) to a revised schema version (schema 2). Table 14 illustrates the resulting upgraded document "DocUpgradedwithBug.xml" with defects caused by the defective upgrade stylesheet of Table 13. Table 15 illustrates the resulting downgraded document "DocDowngradedwithBug.xml" after applying the downgrade stylesheet (Table 7) to the uprgraded document with defects of Table 14. Table 16 illustrates the resulting comparison report "ComparisonReportwithBug.xml" resulting from the comparison of the upgraded document of Table 14 with the downgraded document of Table 15. Table 16 illustrates the filtered comparison report "ComparisonReportFilteredwithBug.xml" after filtering of known discrepancies.

As illustrated by Table 13, at line 73 in the defective upgrade stylesheet, the "@*" was changed to "*" which is a mistake a stylesheet author could make. Because of the mistake, child elements of "Equipment" are copied to the upgraded document "DocUpgradedwithBug.xml" (Table 14) instead of child attributes. Thus, the documents "DocUpgradedwithBug.xml" (Table 14) and "DocDowngradedwithBug.xml" (Table 15) have attributes missing. Accordingly, the resulting comparison report "CompareReportwithBug.xml" (Table 16) is longer than the corresponding comparison report "CompareReport.xml" (Table 9) and the filtered comparison report "CompareReportFilteredwithBug.xml" (Table 17) is not empty; rather it identifies four instances of discrepancies, namely where an attribute is missing because of bad transformations.

TABLE 13 schema1to2withBug.xsl

```
<?xml version="1.0" encoding="ISO-8859-1" ?>
- <xsl:stylesheet version="1.0"
xmlns:xsl="http://www.w3.org/1999/XSL/Transform">
    <xsl:output method="xml" encoding="UTF-8" indent="yes" />
    <xsl:strip-space elements="*" />
- <!--
This document needs to:
  1. Put "2" in ParkReservations/@schemaVersion
  2. If ParkReservations/Reservation/Funtion/@Sport is "Soccer" change
it to "Unknown"
  3. If ParkReservations/Reservation/Function/@LightingNeeded is "Yes"
change it to "true", "No" to "false" and remove it if "Do not care"
  4. If ParkReservations/Reservation/Equipment/@ItemName is "Goals",
remove the Equipment element
  -->
    <xsl:param name="SchemaVersion" select="'2'" />
- <xsl:template match="ParkReservations">
- <xsl:element name="{name( )}">
- <xsl:for-each select="@*">
- <xsl:choose>
- <!-- Requirement #1 - change the schemaVersion
  -->
- <xsl:when test="name( ) = 'schemaVersion'">
- <xsl:attribute name="schemaVersion">
    <xsl:value-of select="$SchemaVersion" />
    </xsl:attribute>
    </xsl:when>
- <xsl:otherwise>
    <xsl:copy-of select="." />
    </xsl:otherwise>
    </xsl:choose>
    </xsl:for-each>
    <xsl:apply-templates select="*" />
    </xsl:element>
    </xsl:template>
- <xsl:template match="Function/@Sport">
- <!-- Requirement #2 - no Soccer
  -->
- <xsl:choose>
- <xsl:when test=". = 'Soccer'">
- <xsl:attribute name="{name( )}">
    <xsl:text>Unknown</xsl:text>
    </xsl:attribute>
    </xsl:when>
- <xsl:otherwise>
    <xsl:copy-of select="." />
    </xsl:otherwise>
    </xsl:choose>
    </xsl:template>
- <xsl:template match="Function/@LightingNeeded">
- <!-- Requirement #3 - change the LightingNeeded to boolean
  -->
- <xsl:choose>
- <xsl:when test=". ='Yes'">
- <xsl:attribute name="{name( )}">
    <xsl:text>true</xsl:text>
    </xsl:attribute>
    </xsl:when>
- <xsl:when test=". = 'No'">
- <xsl:attribute name="{name( )}">
    <xsl:text>false</xsl:text>
    </xsl:attribute>
    </xsl:when>
```

TABLE 13-continued schema1to2withBug.xsl

```
    </xsl:choose>
    </xsl:template>
- <!-- Requirement #4 - no Goals remove the whole element
  -->
- <xsl:template match="Equipment">
- <xsl:if test="@ItemName !='Goals'">
- <xsl:element name="{name( )}">
    <xsl:apply-templates select="*" />
    </xsl:element>
    </xsl:if>
    </xsl:template>
- <!-- Identity template for attributes, text, and comments
  -->
- <xsl:template match="@*|text( )|comment( )">
- <xsl:copy>
    <xsl:apply-templates />
    </xsl:copy>
    </xsl:template>
- <!-- Identity template for elements
  -->
- <xsl:template match="*">
- <xsl:element name="{name( )}">
    <xsl:apply-templates select="@*" />
    <xsl:apply-templates select="text( )" />
    <xsl:apply-templates select="comment( )" />
    <xsl:apply-templates select="*" />
    </xsl:element>
    </xsl:template>
    </xsl:stylesheet>
```

TABLE 14

DocUpgradedwithBug.xml

```
<?xml version="1.0" encoding="UTF-8" ?>
- <ParkReservations schemaVersion="2">
- <Reservation>
    <Function Sport="Baseball" LightingNeeded="true" />
    <Equipment />
    <Equipment />
    </Reservation>
- <Reservation>
    <Function Sport="Unknown" LightingNeeded="false" />
    </Reservation>
- <Reservation>
    <Function Sport="Volleyball" />
    <Equipment />
    </Reservation>
    </ParkReservations>
```

TABLE 15

DocDowngradedwithBug.xml

```
<?xml version="1.0" encoding="UTF-8" ?>
- <ParkReservations schemaVersion="1">
- <Reservation>
    <Function Sport="Baseball" LightingNeeded="Yes" />
    <Equipment />
    <Equipment />
    </Reservation>
- <Reservation>
    <Function Sport="Unknown" LightingNeeded="No" />
    </Reservation>
- <Reservation>
    <Function Sport="Volleyball" />
    <Equipment />
    </Reservation>
    </ParkReservations>
```

TABLE 16

CompareReportwithBug.xml

```
<?xml version="1.0" encoding="UTF-8" ?>
- <bc:ComparisonReport
  xmlns:bc="http://www.amd.com/schemas/Compare/3_0_0">
- <bc:Problem type="AttributeMissing">
    <bc:XPath>ParkReservations/Reservation/Equipment</bc:XPath>
    <bc:Location>ParkReservations/Reservation/Equipment</bc:Location>
    <bc:Attribute new="Baseballs">ItemName</bc:Attribute>
  </bc:Problem>
- <bc:Problem type="AttributeMissing">
    <bc:XPath>ParkReservations/Reservation/Equipment</bc:XPath>
    <bc:Location>ParkReservations/Reservation/Equipment</bc:Location>
    <bc:Attribute new="Bats">ItemName</bc:Attribute>
  </bc:Problem>
- <bc:Problem type="AttributeChange">
    <bc:XPath>ParkReservations/Reservation/Function</bc:XPath>
    <bc:Location>ParkReservations/Reservation/Function</bc:Location>
    <bc:Attribute old="Soccer" new="Unknown">Sport</bc:Attribute>
  </bc:Problem>
- <bc:Problem type="ElementMissing">
    <bc:Xpath>ParkReservations/Reservation</bc:XPath>
    <bc:Location>ParkReservations/Reservation</bc:Location>
    <bc:Element>Equipment</bc:Element>
  </bc:Problem>
- <bc:Problem type="AttributeMissing">
    <bc:XPath>ParkReservations/Reservation/Equipment</bc:XPath>
    <bc:Location>ParkReservations/Reservation/Equipment</bc:Location>
    <bc:Attribute new="Goals">ItemName</bc:Attribute>
  </bc:Problem>
- <bc:Problem type="AttributeMissing">
    <bc:Xpath>ParkReservations/Reservation/Function</bc:XPath>
    <bc:Location>ParkReservations/Reservation/Function</bc: Location>
    <bc:Attribute new="Do not care">LightingNeeded</bc:Attribute>
  </bc:Problem>
- <bc:Problem type="AttributeMissing">
    <bc:XPath>ParkReservations/Reservation/Equipment</bc:XPath>
    <bc:Location>ParkReservations/Reservation/Equipment</bc:Location>
    <bc:Attribute new="Volleyballs">ItemName</bc:Attribute>
  </bc:Problem>
  </bc:ComparisonReport>
```

TABLE 17

CompareReportFilteredwithBug.xml

```
<?xml version="1.0" encoding="UTF-8" ?>
- <bc:ComparisonReport
  xmlns:bc="http://www.amd.com/schemas/Compare/3_0_0">
- <bc:Problem type="AttributeMissing">
    <bc:XPath>ParkReservations/Reservation/Equipment</bc:XPath>
    <bc:Location>ParkReservations/Reservation/Equipment</bc:Location>
    <bc:Attribute new="Baseballs">ItemName</bc:Attribute>
  </bc:Problem>
- <bc:Problem type="AttributeMissing">
    <bc:XPath>ParkReservations/Reservation/Equipment</bc:XPath>
    <bc:Location>ParkReservations/Reservation/Equipment</bc:Location>
    <bc:Attribute new="Bats">ItemName</bc:Attribute>
  </bc:Problem>
- <bc:Problem type="AttributeMissing">
    <bc:XPath>ParkReservations/Reservation/Equipment</bc:XPath>
    <bc:Location>ParkReservations/Reservation/Equipment</bc:Location>
    <bc:Attribute new="Goals">ItemName</bc:Attribute>
  </bc:Problem>
- <bc:Problem type="AttributeMissing">
    <bc:XPath>ParkReservations/Reservation/Equipment</bc:XPath>
    <bc:Location>ParkReservations/Reservation/Equipment</bc:Location>
    <bc:Attribute new="Volleyballs">ItemName</bc:Attribute>
```

TABLE 17-continued

CompareReportFilteredwithBug.xml

```
  </bc:Problem>
  </bc:ComparisonReport>
```

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
transforming, based on a first transform, a first markup language document associated with a first version of a schema to generate a second markup language document associated with a second version of the schema, wherein the second markup language document is representative of a third markup language document associated with the second version of the schema and wherein the first transform represents a transform from the first version of the schema to the second version of the schema;
comparing the second markup language document to the third markup language document to identify whether at least one discrepancy exists between the second markup language document and the third markup language document; and
determining a suitability of the first transform based on the comparison of the second markup language document to the third markup language document.

2. The method of claim 1, wherein determining the suitability of the first transform comprises:
determining the first transform as suitable in response to the comparison identifying no discrepancies between the second markup language document and the third markup language document; and
determining the first transform as unsuitable in response to the comparison identifying at least one discrepancy between the second markup language document and the third markup language document.

3. The method of claim 1, further comprising:
transforming, based on a second transform, the third markup language document to generate the first markup language document, wherein the second transform represents a transform from the second version of the schema to the first version of the schema.

4. The method of claim 3, wherein:
transforming the first markup language document comprises transforming the first markup language document using a first stylesheet representative of the first transform; and
transforming the third markup language document comprises transforming the third markup language document using a second stylesheet representative of the second transform.

5. The method of claim 3, further comprising:
determining a suitability of the second transform based on the comparison of the second markup language document to the third markup language document.

6. The method of claim 5, wherein determining the suitability of the first transform and determining the suitability of the second transform comprise:

determining the first transform and second transform as suitable in response to the comparison identifying no discrepancies between the second markup language document and the third markup language document; and determining the first transform and second transform as unsuitable in response to the comparison identifying at least one discrepancy between the second markup language document and the third markup language document.

7. The method of claim 1, wherein comparing the second markup language document to the third markup language document includes determining whether an attribute of an element in one of the second markup language document or the third markup language document is absent from the element in the other of the second markup language document or the third markup language document.

8. The method of claim 1, wherein comparing the second markup language document to the third markup language document includes determining whether an element in one of the second markup language document or the third markup language document is absent from the other of the second markup language document or the third markup language document.

9. The method of claim 1, wherein comparing the second markup language document to the third markup language document includes determining whether a first attribute of an element in the second markup language document is different than a corresponding second attribute of the element in the third markup language document.

10. The method of claim 1, wherein:
comparing the second markup language document to the third markup language document comprises generating a comparison report representing a set of discrepancies between the second markup language document and the third markup language document identified as a result of comparing the second markup language document with the third markup language document; and determining the suitability of the first transform comprises filtering out one or more predetermined discrepancies from the set of discrepancies to generate a discrepancies report representing remaining discrepancies from the set of discrepancies.

11. The method of claim 10, wherein determining whether the suitability of the first transform comprises:
determining the first transform as suitable in response to an absence of remaining discrepancies in the discrepancies report; and determining the first transform as unsuitable in response to a presence of remaining discrepancy in the discrepancies report.

12. The method of claim 10, wherein:
the comparison report comprises a fourth markup language document and the discrepancies report comprises a fifth markup language document; and filtering out one or more predetermined discrepancies from the set of one or more discrepancies comprises transforming the fourth markup language document based on a third transform to generate the fifth markup language document.

13. A server comprising:
a data store to store a first markup language document associated with a first version of a schema;

a transform module operably coupled to the data store, the transform module to generate a second markup language document associated with a second version of the schema based on the first markup language document and a first transform, and generate a third markup language document associated with the first version of the schema based on the second markup language document and a second transform, wherein the first transform represents a transform from the first version of the schema to the second version of the schema and the second transform represents a transform from the second version of the schema to the first version of the schema;

a compare module operably coupled to the transform module, the compare module to generate a comparison report based on a comparison of the third markup language document to the first markup language document, wherein the comparison report represents discrepancies between the first markup language document and the third markup language document identified from the comparison of the third markup language document with the first markup language document; and a verify module operably coupled to the transform module and the compare module, the verify module to filter out previously identified discrepancies from the comparison report to generate a discrepancies report.

14. The server of claim 13, wherein the first transform comprises a first stylesheet and the second transform comprises a second stylesheet.

15. The server of claim 13, wherein the verify module further is to determine a suitability of the first transform and the second transform based on the discrepancies report.

16. The server of claim 13, wherein the verify module is to:
determine the first transform and second transform as suitable in response to an absence of remaining discrepancies in the discrepancies report; and determine at least one of the first transform or the second transform as unsuitable in response to a presence of at least one remaining discrepancy in the discrepancies report.

17. A computer readable medium embodying a set of instructions executable by a processing device, the set of executable instructions comprising:
instructions to transform, based on a first transform, a first markup language document associated with a first version of a schema to generate a second markup language document associated with a second version of the schema, wherein the second markup language document is representative of a third markup language document associated with the second version of the schema and wherein the first transform represents a transform from the first version of the schema to the second version of the schema;

instructions to compare the second markup language document to the third markup language document to identify whether at least one discrepancy exists between the second markup language document and the third markup language document; and instructions to determine a suitability of the first transform based on the comparison of the second markup language document with the third markup language document.

18. The computer readable medium of claim 17, wherein the set of executable instructions further comprises:
instructions to transform, based on a second transform, the third markup language document to generate the first markup language document, wherein the second transform represents a transform from the second version of the schema to the first version of the schema; and instructions to determine a suitability of the second transform based on the comparison of the second markup language document with the third markup language document.

19. The computer readable medium of claim 18, wherein:
the instructions to compare the second markup language document to the third markup language document comprise instructions to generate a comparison report representing a set of discrepancies between the second markup language document and the third markup language document identified as a result of comparing the second markup language document the third markup language document; and
the instructions to determine the suitability of the first transform and the instructions to determine the suitability of the second transform comprise instructions to filter out predetermined discrepancies from the set of discrepancies to generate a discrepancies report representing remaining discrepancies from the set of discrepancies.

20. The computer readable medium of claim 17, wherein the instructions to determine the suitability of the first transform comprise:
instructions to determine the first transform as suitable in response to the comparison identifying no discrepancies between the second markup language document and the third markup language document; and
instructions to determine the first transform as unsuitable in response to the comparison identifying at least one discrepancy between the second markup language document and the third markup language document.

* * * * *